Feb. 3, 1953 H. H. HARADA 2,627,401
SPEED CUP BIAS SPRING
Filed Sept. 13, 1947

Inventor
Henry H. Harada
By
Spencer, Willits, Helmig & Baillio
Attorneys

Patented Feb. 3, 1953

2,627,401

UNITED STATES PATENT OFFICE 2,627,401

SPEED CUP BIAS SPRING

Henry H. Harada, Grand Blanc, Mich., assignor to General Motors Corporation, Detroit, Mich., a corporation of Delaware Application September 13, 1947, Serial No. 773,832

4 Claims. (Cl. 267—1)

The present invention relates to a speedometer of the magnetic drag speed cup type. More particularly it relates to a means for anchoring the speed cup biasing spring so as to minimize distortion and resulting inaccuracy in the spring.

The accuracy of a speedometer of the magnetic drag speed cup type depends to a large extent on the correct calibration of the biasing spring and upon the spring being of predetermined rate throughout its usable range. The biasing spring in most speedometers of this type has one end anchored to the frame of the speedometer and the other end attached to the spindle of the speed cup. Such a spring biases the spindle in one direction of rotation while the magnetic drag from the revolving magnet tends to turn the cup and its spindle in the other direction of rotation. In order to properly determine the exact speed of rotation of the magnet it is necessary that the spring bias on the speed cup spindle be accurately calibrated.

Previous to the present invention it has been the practice to anchor this biasing spring to the frame of the speedometer by the use of small wedges or pins frictionally engaging the spring. Any type of attaching means such as this which tightly grips the spring may introduce stresses and deform the spring thus giving the spring an unequal rate which cannot be predicted or corrected for by the normal procedure of zero setting.

It is therefore an object of the present invention to produce a speed cup biasing spring anchoring means which does not permanently deform the spring.

It is also an object of the present invention to produce a spring anchoring means which is quickly detachable for servicing the speedometer.

Other objects of this invention will become apparent upon reading the specification and inspection of the drawings and will be particularly pointed out in the claims.

Referring to the figures of the drawing.

Figure 1:
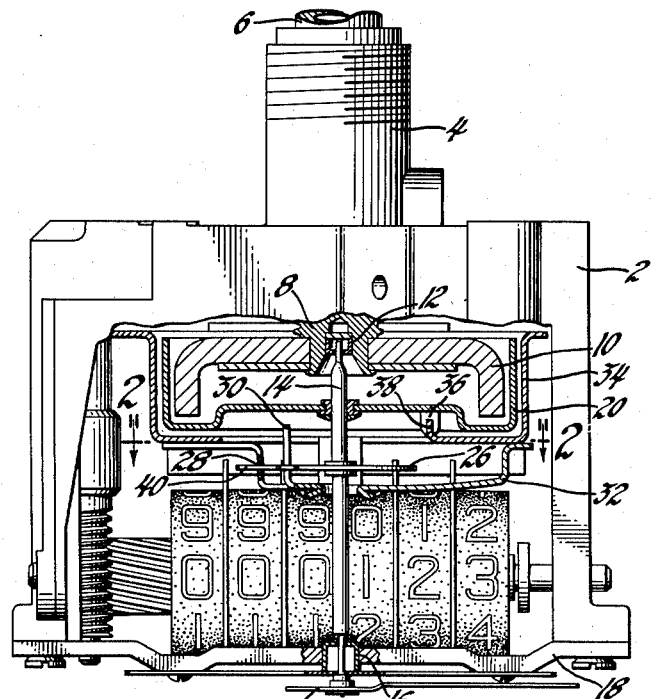
Figure 1 is a partial sectional view of a speedometer using the present invention.

Referring more particularly to the figures, Figure 1 is a partially sectionalized assembly view of a speedometer incorporating the present invention. The casing or frame 2 has a projection 4 thereon which forms a bearing for the end of a rotating drive cable 6. The inner end of the rotating cable connector 8 includes a means for rigidly attaching a permanent magnet element 10 thereto. This inner end of the cable connector also includes a bearing 12 for rotatably supporting the speed cup spindle 14. This spindle has a second bearing support 16 in the member 18 attached to the frame 2. Spindle 14 has rigidly attached thereto a speed cup 20, a speed indicator pointer 24, and the inner end of a spiral biasing spring 26. The outer end of the spiral biasing spring 26 engages a slot 28 and a projection 30 in a stationary member 32 which stationary member is rigidly fixed to the frame 2 through a member 34. The speed cup 20 also has a projection 36 thereon which engages a projection 38 on the member 34 to provide a limit stop to limit the rotation of the speed cup 20 and associated spindle 14 and indicator pointer 24.

Figure 2:
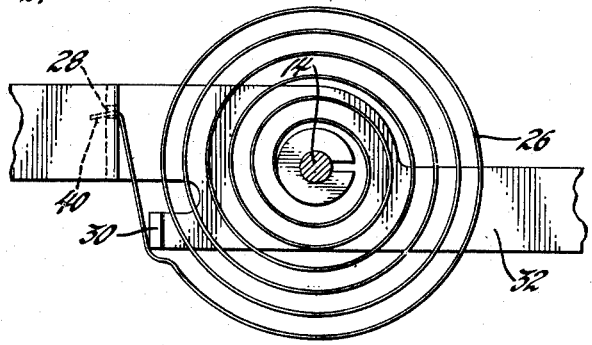
Figure 2 shows one modification of the anchoring means forming a part of the present invention and is a sectional view taken on line 2—2 of Figure 1.

Referring to Figure 2, the method of attaching the spiral spring 26 to the member 32 is shown in greater detail. In this figure it will be noted that the spring has a depending portion 40 thereon which is inserted through the opening 28 in the member 32 in such a manner as to offer no permanent deforming action on the spring. In this figure it may readily be seen that the spring has complete freedom of movement between the point it contacts the projection 30, and the point at which it is attached to the spindle 14.

Figure 3:
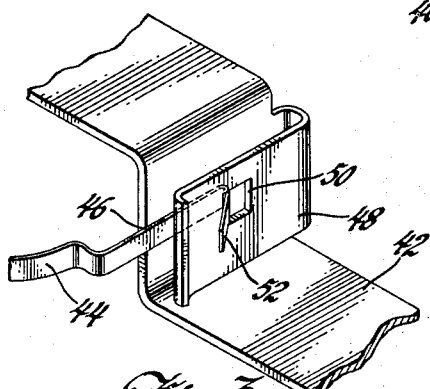
Figure 3 shows a second modification of the anchoring means forming a part of the present invention.

Referring to Figure 3 a second modification of the present invention is shown in which the member 42 corresponds to the member 32 in Figures 1 and 2 and the spring 44 corresponds to the spring 26 in the first two figures. In this modification of the present invention the member 42 engages the spring 44 at the point 46. The projection 48 of the member 42 has a slot or opening 50 therein. The spring 44 has a depending portion 52 thereon which may be inserted through the opening 50 to take tensile stresses. Here again, the speed cup biasing spring has no permanent deformation at its point of attachment to its anchoring member. This spring has complete freedom of movement between the point 46 and its point of attachment to the spindle of the speed cup.

Operation

The shaft or cable 6 is driven at a speed which is proportional to the velocity the speedometer is designed to measure. The magnet 10 being rigidly attached to the cable 6 is driven at the same speed as the cable. The flux linkage from this revolving magnet exerts a drag on the speed cup 20 which is proportional to the speed of rotation of the magnet. The speed cup is biased by the hair spring 26 in a direction opposite to that of the force exerted by the rotating magnet and in an amount proportional to the angular position from zero of the speed cup. It may thus be seen that the angular position of the pointer 24 from its zero position indicates the speed of rotation of the permanent magnet 10 and therefore correctly indicates the speed to be measured. If, however, the spring 26 has an unknown rate due to residual stresses so that the biasing force which it exerts on the speed cup is not accurately known, the pointer 24 will not accurately indicate the speed of rotation of the magnets 10. The present invention by providing a means for attaching the biasing spring to the frame without introducing permanent distortion permits the spring rate to be exactly uniform throughout its range. This causes the angular displacement of the pointer 24 to correctly indicate the speed of rotation of the magnet 10 and thereby correctly indicate the speed being measured.

It is to be understood also that although the invention has been described with specific reference to a particular embodiment thereof, it is not to be so limited, since changes and alterations therein may be made which are within the full intended scope of this invention as defined by the appended claims.

I claim:

1. A system for biasing a rotatable member in one direction of rotation including; a spiral biasing spring, a stationary member, a spindle supporting the rotatable member on said stationary member, means for rigidly attaching the inner end of said spiral biasing spring to said spindle and means for attaching the outer end of said spring to said stationary member consisting of two fixedly spaced points of contact between said member and said spring on opposite faces of said spring one of said points of contact between said spring and said stationary member consisting of a hooked portion of said spring being inserted, and loosely supported in an aperture in said stationary member on the face of said spring disposed away from the convolutions thereof.

2. A system for biasing a rotatable member in one direction of rotation only including; a spiral spring having its inner end attached to the rotatable member, a stationary member having two spaced parallel surfaces one of said surfaces having an aperture therein, means for anchoring the outer end of said spring to said stationary member, said last mentioned means including a bent portion at the outer end of said spring extending away from the convolutions thereof and projecting through said aperture and loosely held in place therein and the other of said parallel surfaces loosely supporting the spring at a fixed point spaced from said aperture.

3. A device for biasing a rotatable member in one direction of rotation including, a spiral biasing spring, a stationary member having an aperture therein, a spindle rotatably supporting said rotatable member on said stationary member, means for attaching the inner end of said biasing spring to said spindle, and means for attaching the outer end of said spring to said stationary member, consisting of two laterally and longitudinally spaced fixed points of support between said spring and said stationary member including a hook portion on the outer end of said spring bent away from the direction of said spindle and being loosely supported on one face thereof in the said aperture in said stationary member, and means on said stationary member engaging the opposite face of said spring at a point spaced from said hook portion.

4. A device for biasing a rotatable member in one direction of rotation including, a spiral biasing spring, a fixed casing, a spindle rotatably supporting said member on said casing, means for rigidly attaching the inner end of said biasing spring to said spindle, and means for attaching the outer end of said spring to said casing, said last mentioned means consisting of two parallel portions constantly spaced from each other both laterally and longitudinally on said casing, one of said portions having an aperture therein, a bent portion at the outer end of said spring extending away from the convolutions of said spring, said bent portion projecting into and loosely supported in said aperture, and the other of said parallel portions loosely supporting said spring at a point spaced from said bent portion, said lateral and longitudinal spacing being of such dimensions that the spring and casing cannot contact each other except at said aperture and said point.

HENRY H. HARADA.

REFERENCES CITED

The following references are of record in the file of this patent:

UNITED STATES PATENTS

| Number | Name | Date |
|---|---|---|
| 1,760,844 | Helgeby | May 27, 1930 |
| 1,760,857 | Berg | May 27, 1930 |
| 2,073,153 | Helgeby | Mar. 9, 1937 |
| 2,114,191 | Le Fevre | Apr. 12, 1938 |
| 2,142,248 | Le Fevre | Jan. 3, 1939 |
| 2,209,172 | Putnam | July 23, 1940 |

FOREIGN PATENTS

| Number | Country | Date |
|---|---|---|
| 233,614 | Germany | Apr. 15, 1911 |
| 579,268 | Germany | June 22, 1933 |